United States Patent [19]

Schwarz

[11] Patent Number: 5,531,215

[45] Date of Patent: Jul. 2, 1996

[54] DEVICE FOR ABSORBING RADIANT HEAT ENERGY

[76] Inventor: Alois Schwarz, Schwendter Strasse 28, A-6382 Kirchdorf in Tirol, Austria

[21] Appl. No.: 206,435

[22] Filed: Mar. 4, 1994

[30] Foreign Application Priority Data

Mar. 4, 1993 [AT] Austria ........................ 415/93

[51] Int. Cl.⁶ .................................................. F24J 2/38
[52] U.S. Cl. .................... 126/578; 126/572; 126/598; 126/600; 126/658; 126/660; 126/663; 126/693; 126/692
[58] Field of Search ......................... 126/658, 659, 126/660, 663, 623, 692, 693, 694, 695, 70, 572, 578, 573, 598, 593, 600, 702, 657, 655; 277/226

[56] References Cited

U.S. PATENT DOCUMENTS

| 2,323,179 | 6/1943 | Hall et al. ....................... 277/226 X |
| 4,011,855 | 3/1977 | Eschelman ........................... 126/660 |
| 4,138,997 | 2/1979 | LaPorte et al. ..................... 126/658 |
| 4,142,510 | 3/1979 | Hare et al. .......................... 126/660 |
| 4,167,178 | 9/1979 | Brussels ........................... 126/658 X |
| 4,219,008 | 8/1980 | Schultz ............................ 126/692 X |
| 4,334,120 | 6/1982 | Yamano et al. .................... 126/659 X |
| 4,340,034 | 7/1982 | Hopper .............................. 126/659 |

FOREIGN PATENT DOCUMENTS

| 70747 | 1/1983 | European Pat. Off. . | |
| 249919 | 12/1987 | European Pat. Off. . | |
| 524165 | 7/1992 | European Pat. Off. . | |
| 2418426 | 9/1979 | France | 126/658 |
| 2518233 | 6/1983 | France | 126/657 |
| 8175752 | 10/1983 | Japan | 126/659 |
| 36-50339 | 3/1985 | Japan | 126/658 |
| 1474391 | 4/1989 | U.S.S.R. | 126/657 |

Primary Examiner—Carl D. Price
Attorney, Agent, or Firm—Herbert L. Lerner; Laurence A. Greenberg; Werner H. Stemer

[57] ABSTRACT

A device for absorbing heat energy, in particular a solar panel, includes a housing in the form of a frame-shaped rack. The housing has a cover which allows the radiant energy to enter. Several collector tubes are disposed below the cover and between a distributor tube and a gathering tube. The collector tubes are provided with wing-shaped collector elements. The collector tubes are rotatably mounted such that the collector elements can follow the position of the radiation source, such as the sun. The collector elements are thereby disposed at a mutual spacing such that a shading from the adjacent collector element is prevented, even at the lowermost position of the sun. The collector elements are further provided with a heat absorbing coating on both sides, and reflectors are provided below the collector elements as seen in the direction of the incoming heat radiation. Heat radiation which does not impinge on the top surfaces of the collector elements, and is thus not absorbed thereon, is reflected onto their bottom surfaces.

11 Claims, 5 Drawing Sheets

DEVICE FOR ABSORBING RADIANT HEAT ENERGY

BACKGROUND OF THE INVENTION

1. Field of the Invention

The invention relates to a device for absorbing radiant heat energy, in particular solar energy. The heat collector comprises a frame-like rack in which several collector tubes are disposed below a cover and between a distributor tube and a gathering tube, the collector tubes are provided with wing-like collector elements, whereby the collector tubes are rotatably supported, rendering the collector elements capable of following the position of the sun.

2. Description of the Related Art

A heat collector with pivotable collector elements is disclosed by this inventor in his European published patent application EP 524 165 A1. The collector elements can be pivoted so as to follow the position of the sun for attaining optimal absorption of the radiant heat energy. The sun rays impinge on the fin-like collector elements at a right angle. That device, however, is disadvantageous in that the collector elements are disposed immediately adjacent to one another in the plane in which they are disposed in the device. That means that, when the sun is at a low position and the collector elements are oriented obliquely relative to the device, certain areas of the collector elements are shaded by adjacent collector elements which lie in the path of the incoming sun rays. No heat energy can be absorbed by the shaded regions. Since, furthermore, the heat energy absorbed by the non-shaded regions of the collector elements migrates into the shaded regions of the collector elements (the heat energy is thus not properly evacuated via the collector tubes), those prior art solar collectors exhibit a very limited degree of efficiency when the sun is at a lower position.

SUMMARY OF THE INVENTION

It is accordingly an object of the invention to provide a device for absorbing radiant heat energy, which overcomes the hereinafore-mentioned disadvantages of the heretofore-known devices of this general type and which assures an optimal degree of efficiency independently of the relative position of the sun.

With the foregoing and other objects in view there is provided, in accordance with the invention, a device for absorbing radiant heat energy, comprising:

a housing or a frame-like rack with a top;

a heat radiation-permeable cover disposed on the top of the housing;

a distributor tube for feeding a heat carrier into the assembly, a plurality of collector tubes each communicating with the distributor tube, and a gathering tube communicating with each of the collector tubes, each of the tubes being disposed below the heat radiation-permeable cover;

a plurality of, preferably wing-shaped or vane-like, collector elements disposed on the collector tubes, each of the collector elements having an upper surface and a lower surface as seen in a direction of heat radiation entering the assembly through the cover, a heat-absorbing coating disposed on the upper and the lower surfaces;

reflector means disposed below the collector elements as seen in the direction of the heat radiation entering the assembly for reflecting heat radiation which has not been absorbed by the upper surface onto the lower surface; and the collector tubes being rotatably mounted in the assembly in a mutually spaced-apart relationship for allowing the collector elements to be pivoted such that the upper surface faces towards the heat radiation entering the assembly.

In accordance with an added feature of the invention, the collector tubes are mutually spaced apart at a given spacing therebetween, the spacing being defined relative to a width of the collector elements such that adjacent collector elements do not shade one another from the heat radiation entering the assembly. Preferably, that given spacing is approximately equal to twice the given width of the collector elements.

In other words, the objects of the invention is solved in that the collector tubes or the collector elements are located at such a distance from one another that even in the case of the lowest sun position no mutual shading is caused by adjacent collector elements. Quite importantly, also, the collector elements are further formed with a heat absorbing coating on both sides and reflectors are provided behind the collector elements as seen in the direction of the incoming heat radiation. The radiation, therefore, which "misses" to upper absorbing surface on the collector elements, is then reflected from the reflectors and onto the back side of the collector elements. Virtually all of the heat radiation is thus absorbed.

Due to the fact that neighboring collector elements are disposed at a sufficient spacing from one another, it is assured even at a very low position of the sun that shading of areas of the collector element surfaces of adjacent elements does not occur, whereby the entire heat energy reaching the same is evacuated via the collector tubes. If, on the other hand, heat is radiated in between the spaced-apart collector elements at a medium or high position of the sun, the same reaches the back sides of the collector elements via reflectors. The back sides or lower absorbing surfaces are thereby preferably also provided with a heat absorbing coating, so that the entire incoming heat radiation is absorbed by the collector elements at any position of the sun.

Furthermore, the reflectors which are disposed behind the collector elements as seen in the direction of the incoming radiation preferably have a cross section which is approximately arcuate concave. Due to the fact that the reflectors are formed like parabolic mirrors, it is assured that the energy radiated in between the collector elements is virtually entirely reflected onto the back sides of the collector elements.

Prior at heat collectors have the further problem that the collector elements are disposed in the plane of the collector tube, whereby those heat collectors must be disposed at an angle of about 60° relative to the horizontal in order to attain optimal irradiation by the solar energy. As far as such devices are disposed on roofs, however, and whereby it is required that they be installed at the roof pitch, optimal irradiation and absorption cannot be assured. The present invention is thus further based on the object to provide such a device with which maximum irradiation is assured independently of the pitch of the roof on which it is installed. This is attained, in accordance with the invention, in that the individual collector elements are divided into a plurality of partial surfaces which form an acute angle of 10° to 45° relative to the axis of the collector tubes.

Heat collectors can thereby be provided in which, independently of the pitch of the roof on which they are installed, the collector surfaces are disposed at an angle of about 60° from the horizontal, which assures optimal absorption of the solar energy.

In heat collectors of this type it is further problematic that very strong irradiation with solar energy can cause overheating. In order to pivot the collector elements for following the position of the sun, prior art collectors are provided with two photocells on the upper surface of at least one of the collector elements; the output signal of the photocells is sent to a control circuit, which has a comparator. That control circuit effects a control of the pivoting of the collector elements such that they are disposed perpendicularly to the incoming sun rays. As soon as the temperature in the collector exceeds a predetermined value, a heat sensor provides as control signal which causes a reversal in which the collector elements, which are provided with a heat absorbing coating only on one side, are rotated by 180°. Due to this, the collector elements no longer absorb heat and overheating of the collector is thus avoided That prior art technology, however, is not applicable in the heat collector according to the invention, because the fin or wing-shaped collector elements are formed with a heat absorbing coating on both sides. In order to prevent overheating of the collector in any case, a third photo diode is disposed on the back of one of the collector elements. The output of the third photo diode is connected to the control circuit when the heat sensor is triggered. As a result, the collector elements are oriented parallel to the solar radiation. Since virtually no heat energy reaches the collector elements in this way, overheating of the collector is avoided.

A further difficulty exists in prior art heat collectors in that an ice layer may form on top of the cover. Such a layer strongly reduces the irradiation of heat energy on the collector elements. In order to allow for the ice layer to slide off, tubes or electrical heater strips may be provided along the side edges extending parallel with the carrier rack.

The heating of the vertically extending edges of the carrier rack effect a melting in those regions of an ice layer present on the cover, due to which the same can slide off the cover.

A further difficulty exists in the prior art heat collectors in the sealing of the collector tubes relative to the distributor tube and the gathering tube due to the fact that the collector tubes are rotatable relative to the distributor tube and the gathering tube and further due to the fact that they are subject to thermal expansion movements in the axial direction. It is known to seal the bearings with O-rings. The prior art seals, however, do not satisfy the requirements in that, on the one hand, very high temperatures may occur during assembly and prior to initial operation and, on the other hand, during operation of the collector, the ethylene glycol present in the heat collector is very aggressive. No materials are known which sufficiently withstand both the heat and hot air as well as the glycol mixture, so as to effect the necessary sealing in all modes of operation.

The present invention is therefore also based on the object to provide a seal between the distributor tube and each of the rotatable collector tubes as well as between each of the collector tubes and the gathering tube; the seal should be effective in all modes of operation. This is attained, in accordance with yet another feature of the invention, in that the sealing of the bearings relative to the distributor tubes and relative to the gathering tube is effected by means of a device which is formed by an axially movable retaining ring (oil seal) and a following disk, whereby the space between the retaining ring and the disk is filled with silicone grease. Preferably, an 0-ring may be disposed just outside the sealing disk.

The sealing function is thereby fulfilled in that the space between the disk and the retaining ring is filled with silicone grease which is resistant relative to high temperatures and relative to glycol, which assures the required sealing both prior to initial operation and also during the operation of the heat collector. Furthermore, due to the filling with grease, the retainer ring is not chemically attacked. The O-rings, which may be formed of arbitrary deformable materials, as for instance asbestos or a metallic material, prevent the silicone grease from being spilled.

With the foregoing and other objects in view, there is also provided, in accordance with the invention, a solar panel, comprising: a rack having a top; a cover disposed on the top of the rack, the cover being permeable to solar radiation; a plurality of heat collector elements disposed in the rack for absorbing heat from the solar radiation entering the assembly through the cover, the heat collector elements each having an upper absorbing surface and a lower absorbing surface; means for pivoting the heat collector elements between a position at which the upper absorbing surfaces are oriented substantially perpendicular to the solar radiation and a position at which the upper absorbing surfaces are oriented substantially parallel to the solar radiation; and reflector means disposed below the collector elements as seen in the direction of the solar radiation for reflecting the solar radiation not absorbed by the upper absorbing surface onto the lower absorbing surface.

In accordance with a concomitant feature of the invention, the absorbing surfaces and the lower absorbing surfaces are provided with a heat-absorbing coating.

Other features which are considered as characteristic for the invention are set forth in the appended claims.

Although the invention is illustrated and described herein as embodied in a device for absorbing radiant heat energy, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
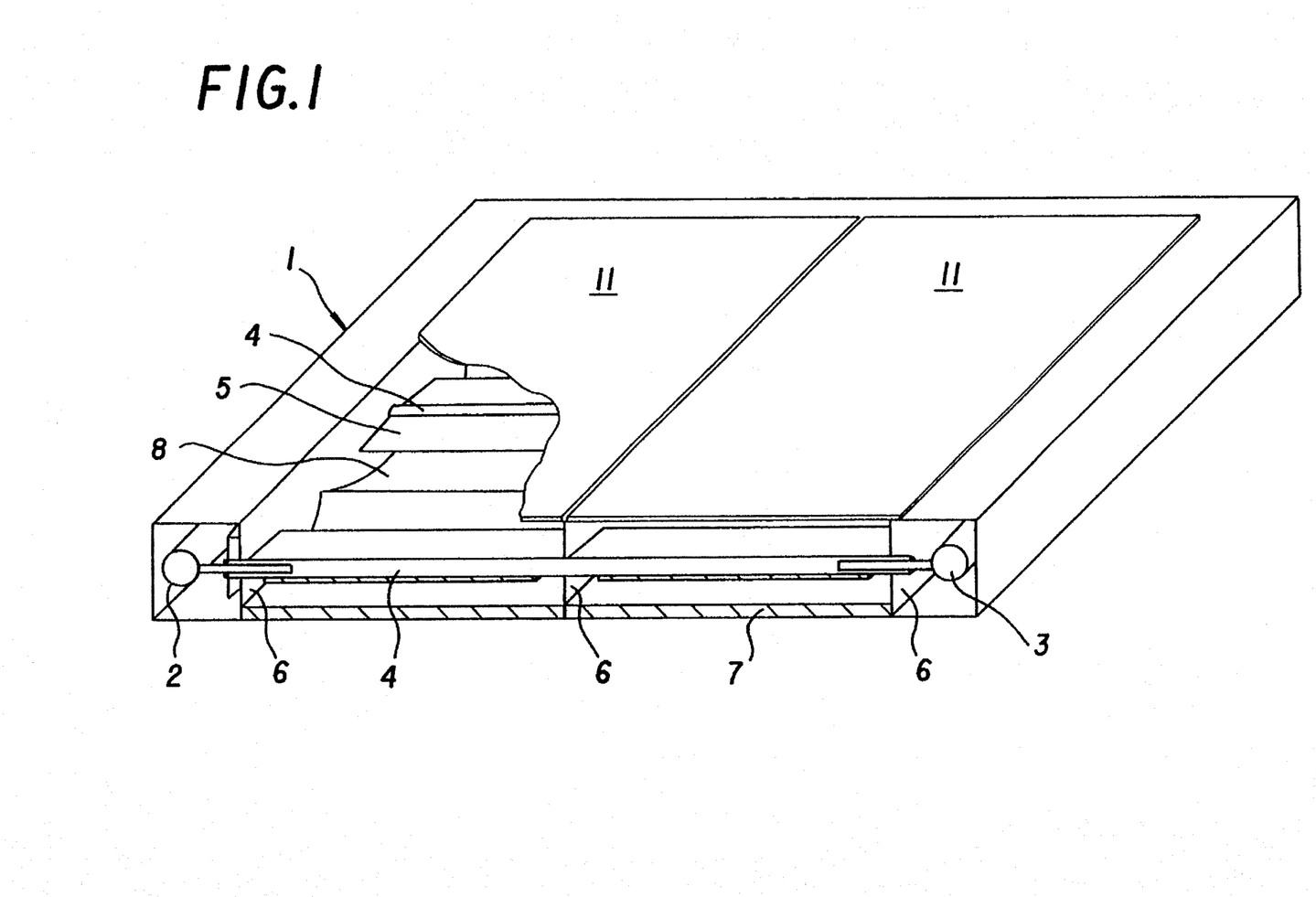
FIG. 1 is a partly broken-away, perspective view of a first embodiment of the invention.

Referring now to the figures of the drawing in detail and first, particularly, to FIG. 1 thereof, there is seen a heat collector in the form of a solar panel which is provided with a housing 1. The housing 1 is also referred to as a frame-like rack 1 in the following, because the only structural requirements therefor are that it be able to support a cover 11 of a heat radiation permeable material at its top and provide support for various tubes on the inside. In other words, the housing 1 need not be a closed structure with a sealed-off interior. Inside the housing 1 there are disposed a feed tube or distributor tube 2 and an output tube or gathering tube 3. A plurality of collector tubes 4 are connected between the tubes 2 and 3 and wing-like collector elements 5 or vanes 5 are disposed on the collector tubes 4. The collector tubes 4 project through openings in web plates 6 oriented parallel to the distributor and gathering tubes 2 and 3, whereby they are supported in the openings. An insulating layer 7 is disposed at the bottom of the housing 1 and a reflector 8 is disposed above the layer 7.

A heat carrier reaches the collector tubes 4 from the distributor tube 2. In the collector tubes 4 it receives heat energy absorbed by the collector elements 5, and then it flow off through the gathering tube 3 into a heat exchanger.

Figure 2A:
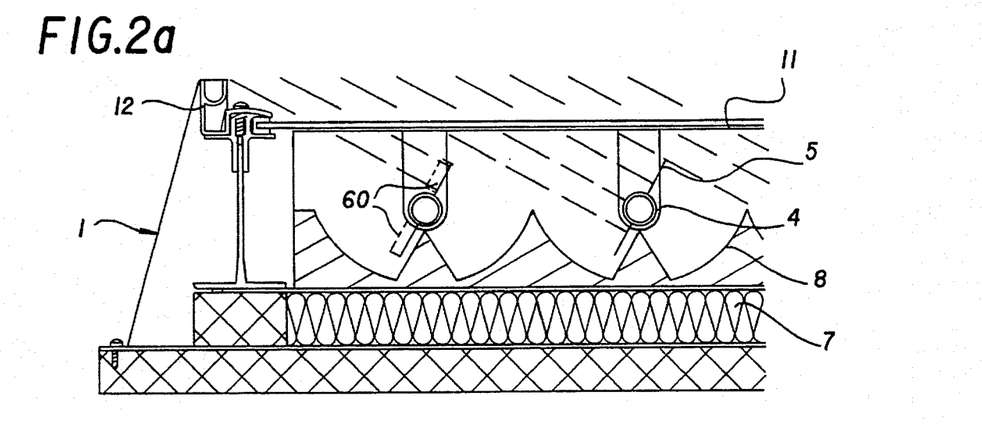
FIGS. 2a–2c are fragmentary cross-sectional views of the heat collector in varying pivot positions of the collector elements.
Figure 2B:
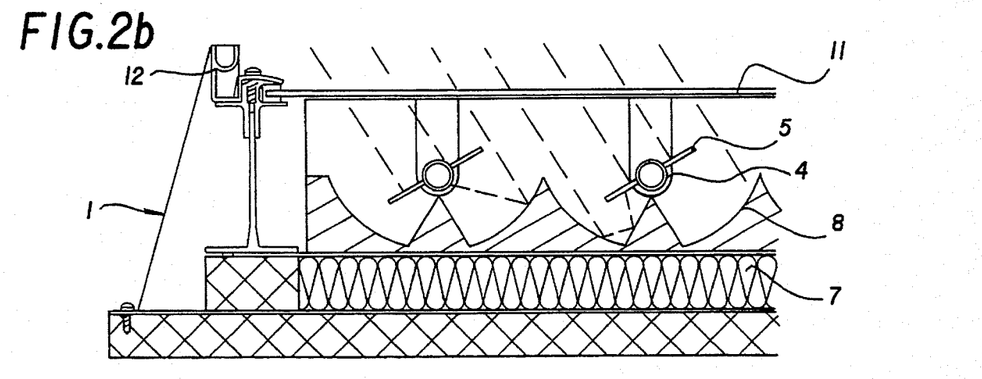
Figure 2C:
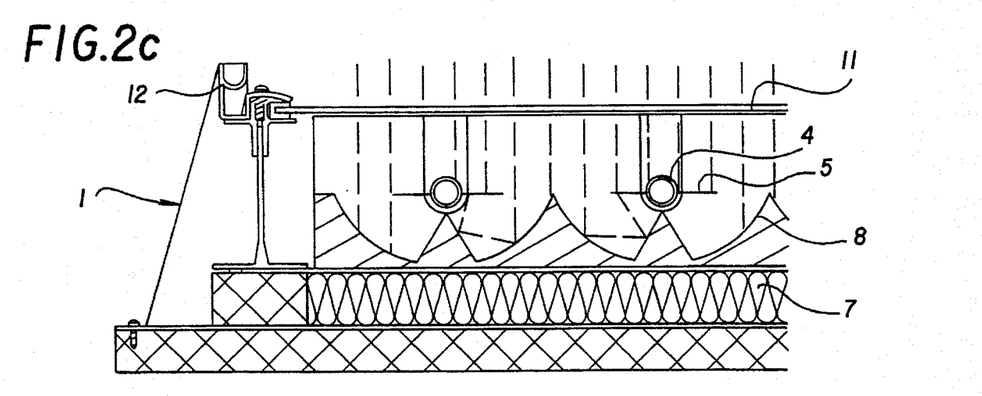

Referring now to FIGS. 2a, 2b and 2c, the collector tubes 4 are placed laterally next to one another at a distance which assures that sun rays, i.e. heat energy, reaches all areas on the collector elements 5. This is assured even in the case of a very low sun position (illustrated in FIG. 2a). Due to the specifically provided spacing between the collector tubes 5, shading of regions of the collector elements 5 which would lead to an inferior degree of efficiency is avoided.

The spacing between the individual collector tubes 4 thereby corresponds to approximately twice the width of the vanes of the collector elements 5.

In order to efficiently collect the incoming heat radiation when the sun is in a higher position and a large proportion of the sun rays therefore arrive in between the individual collector elements, parabola-mirror-like reflectors 8 are provided behind the collector elements as seen in the direction of the incoming rays. Also, the collector elements 5 are provided with a heat absorbing coating on both sides. The heat rays impinging on the reflectors 8 as they traverse between the collector elements 5 are reflected onto the back sides of the collector elements 5 (illustrated in FIGS. 2b and 2c), and they are absorbed at the back sides. The solar panel heat collectors according to the invention therefore have a very high degree of efficiency.

Collector elements can be used which are provided with a metallic coating of a thickness of less than 2 μm. This thin coating assures that even diffuse light irradiation is converted into heat energy. The heat energy is transferred from the collector elements 5 to the collector tubes 4, which transfer the heat to the heat carrier flowing through the collector tubes 4.

Photo-voltaic elements 60 may further be provided on the upper surfaces of the collector elements 5 (illustrated in dashed lines in FIG. 2a), through which an electrical current can be produced with the heat collectors according to the invention. Due to the fact that the heat carrier flowing through the collector tubes 4 effects the necessary cooling, the photo-voltaic elements 60 exhibit a high degree of efficiency as well.

Figure 3:
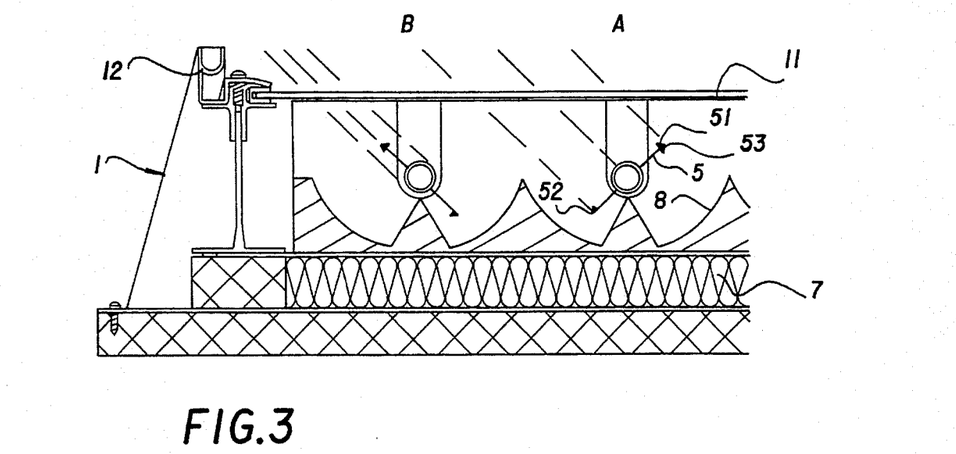
FIG. 3 is a fragmentary cross-sectional view of a second embodiment of the heat collector according to the invention.

As mentioned above, it has heretofore been known to provide photoelectric cells on the upper surface of collectors. With reference to FIG. 3, two photocells 51 and 52 are disposed on at least one of the collector elements 5 for preventing overheating. The outputs of the photocells are connected to a control circuit 53 schematically indicated on the left-hand side of FIG. 3. The control circuit 53 is equipped with a comparator 54. A heat sensor 55 is furthermore provided. An output signal from the heat sensor 55 indicates to the control circuit 53 when a temperature in the heat collector exceeds a predetermined value.

As soon as the predetermined temperature value is exceeded, the control circuit effects a pivoting of the collector elements 5 by a given angle, so that they will not absorb any more heat energy. In the prior art, the pivoting angle has been 180°.

Due to the fact, however, that in the heat collector according to the invention both sides of the collector elements 5 are formed with a heat absorbing coating, due to which heat would also be absorbed if they were pivoted by 180°, a third photo cell 53 is provided on the back side of the collector element 5. Overheating can be prevented by controlling the pivoting of the collector elements 5 from an orientation A to an orientation B, such that the collector elements 5 are oriented parallel to the radiation. Accordingly, virtually no more heat energy is absorbed in the following.

The heat collector housing 1 is provided with a channel-like ledge 12 at its lateral edges for receiving a hose or an electrical heating element, with which the vertically extending edges of the cover 11 are heatable. In the case that an ice layer forms on the cover 11, the same can be melted at the vertical edges and the ice layer can slide downwardly off the cover.

Figure 4:
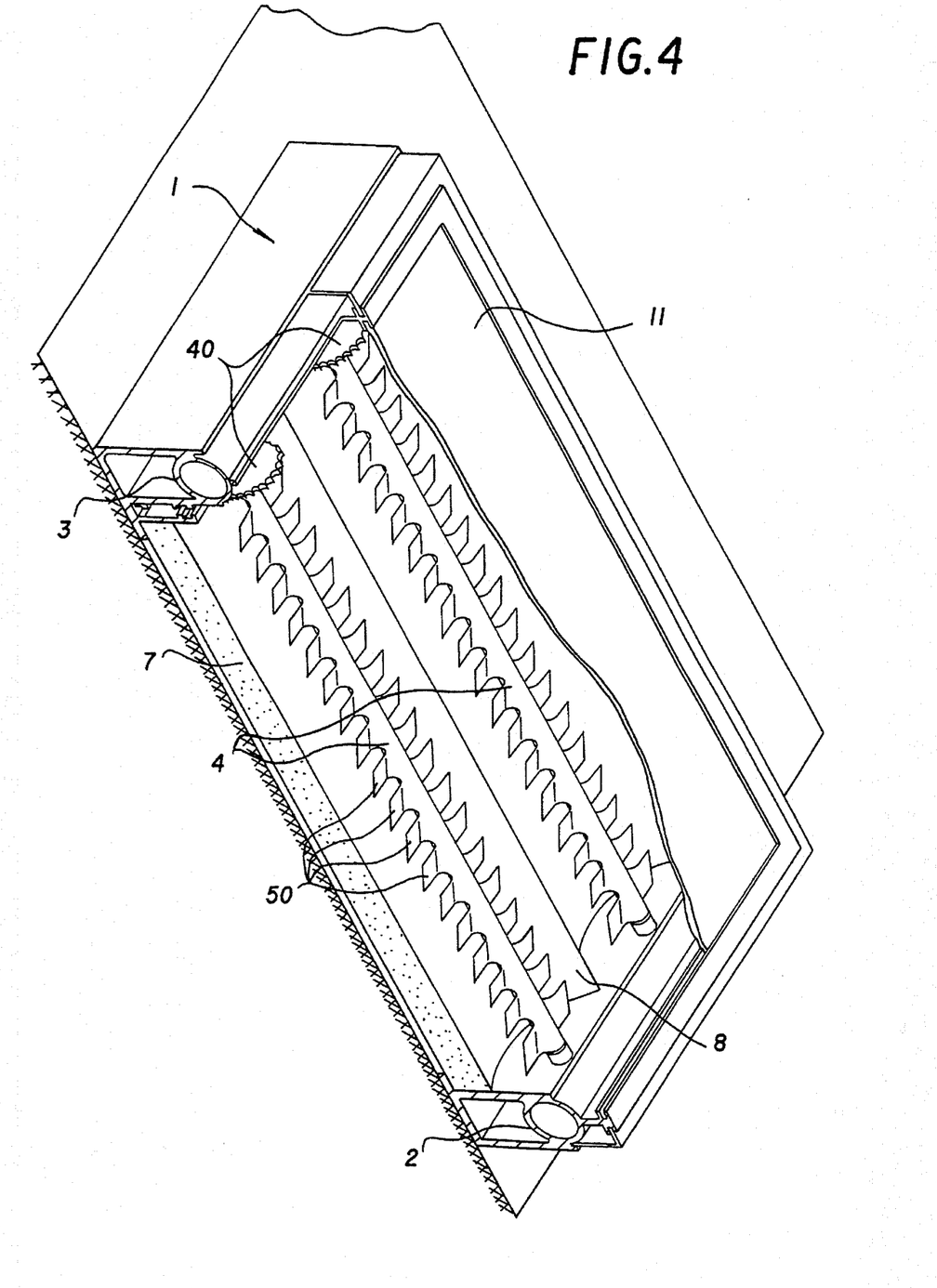
FIG. 4 is a partly broken-away, perspective view of a third embodiment of the heat collector according to the invention.
Figure 5:
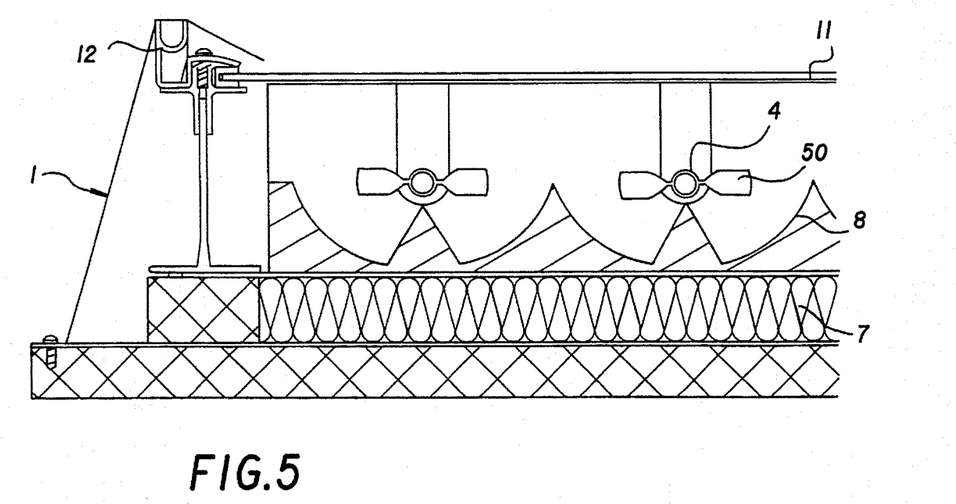
FIG. 5 is a fragmentary cross-sectional view of the heat collector according to FIG. 4.

With reference to FIGS. 4 and 5, the collector tubes 4 may be provided with a plurality of collector elements 50, which form an angle α of 10° to 45° relative to the longitudinal axis of the collector tubes 4. Such heat collectors can thus be utilized on roof surfaces which pitch at an angle of 30° to 50° relative to the horizontal, whereby the collector surfaces are then oriented at an angle of about 60° relative to the horizontal which assures optimal absorption of the irradiated heat energy at latitudes in the range between about 40° and 55° north or south. Other optimal angles are easily adjusted with respect to the latitude at which the device is utilized.

As can be seen from FIG. 4, the collector tubes 4 are provided with toothed wheels 40, by means of which the collector elements 50 are adapted to the position of the sun. The movement is induced with the aid of a chain which simultaneously engages in all of the adjusting wheels 40.

Figure 6:
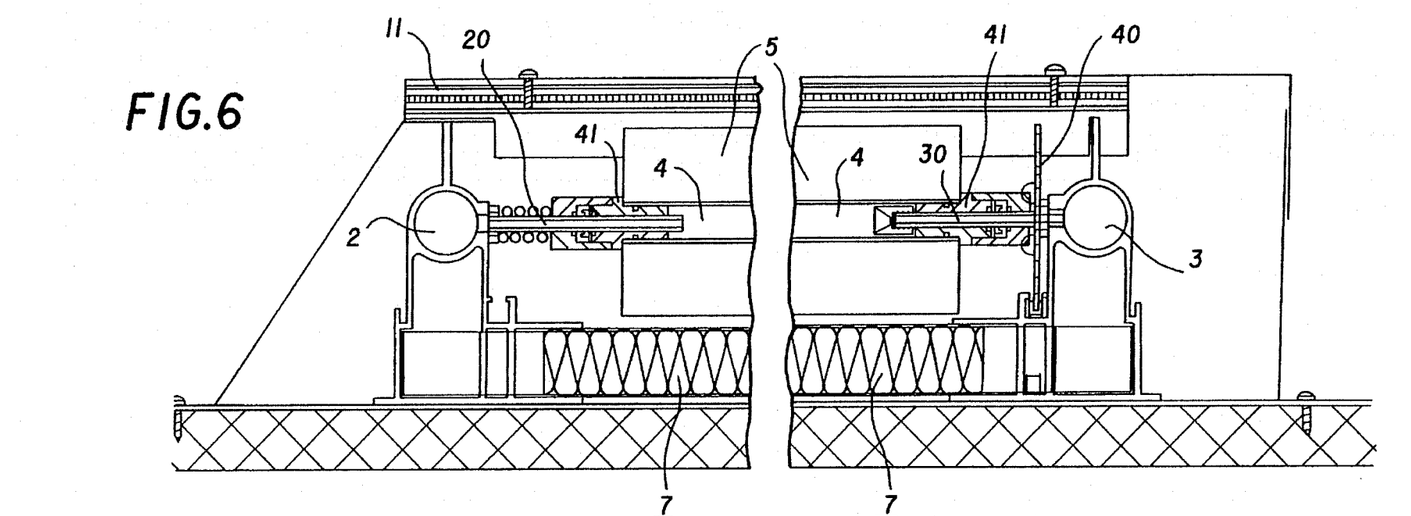
FIG. 6 is a longitudinal-sectional view through the heat collector according to the invention.

With reference to FIG. 6, connector tubes 20 are rigidly connected to the distributor tube 2 from which they emanate.

The connector tubes reach into the associated collector tube 4. Connector tubes 30 emanate also from the gathering tube 3 and they extend into the collector tubes 4 as well. The sealing connection between the collector tube 4 and the respectively associated connector tubes 20 and 30 is effected in that tube stubs 41 are inserted into the collector tube 4 and are rigidly connected therewith. Such a connection may be achieved for instance by means of gluing.

Figure 7:
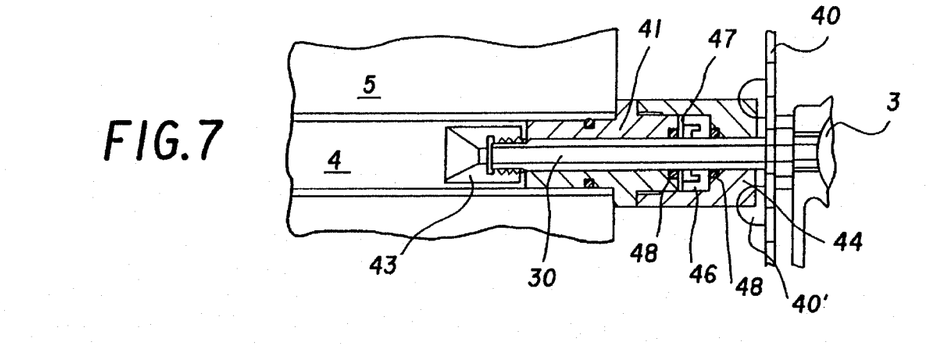
FIG. 7 is a cross-sectional view of an enlarged detail of the embodiment of FIG. 6.

With reference to FIG. 7, the tube stub 41 is provided with a thread at one of its ends onto which a nozzle 43 is screwed. A slotted sleeve 44 is thus pressed against the adjusting wheel 40. In order to effect the necessary seal between the connector tubes 20, 30 and the collector tube 4, a retainer ring 46 or oil seal 46 is disposed on each tube piece 20, 30. A sealing disk 47 is disposed immediately thereafter, whereby the space between the retainer ring 46 and the sealing disk 47 is filled with a sealing medium, such as silicone grease. O-rings 48 are provided outside the retainer ring 46 and the sealing disk 47. The adjusting wheel 40 is provided with catches 40', which come to lie on the collector elements 5 and allow the same to be pivoted.

The actual sealing is effected by the silicone grease present in the space between the retainer ring 46 and the sealing disk. The O-rings 48 effect a mechanical protection against spilling of the silicone grease.

I claim:

1. A device for absorbing radiant heat energy, comprising:
   a frame-like rack having a top;
   a heat radiation-permeable cover disposed on said top of said rack;
   a distributor tube for feeding a heat carrier into said rack, a plurality of collector tubes each communicating with said distributor tube, and a gathering tube communicating with each of said collector tubes, each of said tubes being disposed below said heat radiation-permeable cover;
   a plurality of collector elements disposed on said collector tubes, each of said collector elements having an upper surface and a lower surface as seen in a direction of heat radiation entering said rack through said cover, a heat-absorbing coating disposed on said upper and said lower surfaces;
   reflector means disposed substantially entirely below said collector elements as seen in the direction of the heat radiation entering said rack for reflecting heat radiation which has not been absorbed by said upper surface onto said lower surface; and
   said collector tubes being rotatably mounted in said rack in a mutually spaced-apart relationship for allowing said collector elements to be pivoted such that said upper surface faces towards the heat radiation entering said rack;
   said collector elements being mutually spaced apart with a given spacing therebetween, said spacing being defined relative to a width of said collector elements such that adjacent collector elements do not shade one another from the heat radiation entering said rack; and
   sealing means for sealing said rotatable collector tubes relative to said gathering tube and to said distributor tube, said sealing means including an axially movable retainer ring and a sealing disk adjacent thereto, said retainer ring and said sealing disk forming a space therebetween for receiving silicone grease.

2. The device according to claim 1, wherein said collector elements are wing-shaped collector elements.

3. The device according to claim 1, wherein said collector elements have a given width and said given spacing is approximately equal to twice the given width of said collector elements.

4. The device according to claim 1, wherein said reflector means located behind said collector elements as seen in the direction of the heat radiation entering said rack have an approximately concavely arcuate cross-section.

5. The device according to claim 4, wherein said reflector means are parabolic mirrors.

6. The device according to claim 1, wherein said collector elements have a plurality of partial surfaces defining an acute angle of substantially 10° to substantially 45° relative to a longitudinal axis of said collector tubes.

7. The device according to claim 1, wherein said sealing means further include an 0-ring disposed axially outside the retainer ring and the sealing ring.

8. The device according to claim 1, including photovoltaic elements disposed on said upper surface of said collector elements.

9. A device for absorbing radiant heat energy, comprising:
   a frame-like rack having a top;
   a heat radiation-permeable cover disposed on said top of said rack;
   a distributor tube for feeding a heat carrier into said rack, a plurality of collector tubes each communicating with said distributor tube, and a gathering tube communicating with each of said collector tubes, each of said tubes being disposed below said heat radiation-permeable cover;
   a plurality of collector elements disposed on said collector tubes, each of said collector elements having an upper surface and a lower surface as seen in a direction of heat radiation entering said rack through said cover, a heat-absorbing coating disposed on said upper and said lower surfaces;
   reflector means disposed below said collector elements as seen in the direction of the heat radiation entering said rack for reflecting heat radiation which has not been absorbed by said upper surface onto said lower surface;
   said collector tubes being rotatably mounted in said rack in a mutually spaced-apart relationship for allowing said collector elements to be pivoted such that said upper surface faces towards the heat radiation entering said rack and
   a control circuit with a comparator disposed in said rack, two photocells disposed on said upper surface of at least one of said collector elements and connected to said control circuit, a heat sensor connected to said control circuit, and a further photocell disposed on said lower surface of said collector element and connected to said control circuit.

10. A device for absorbing radiant heat energy, comprising:
    a frame-like rack having a top;
    a heat radiation-permeable cover disposed on said top of said rack;
    a distributor tube for feeding a heat carrier into said rack, a plurality of collector tubes each communicating with said distributor tube, and a gathering tube communicating with each of said collector tubes, each of said tubes being disposed below said heat radiation-permeable cover;
    a plurality of collector elements disposed on said collector tubes, each of said collector elements having an upper surface and a lower surface as seen in a direction of heat radiation entering said rack through said cover, a heat-absorbing coating disposed on said upper and said lower surfaces;
    reflector means disposed below said collector elements as seen in the direction of the heat radiation entering said rack for reflecting heat radiation which has not been absorbed by said upper surface onto said lower surface;
    said collector tubes being rotatably mounted in said rack in a mutually spaced-apart relationship for allowing said collector elements to be pivoted such that said upper surface faces towards the heat radiation entering said rack, wherein said rack has lateral edges, and the device further includes channel means disposed on said lateral edges for receiving a pipe through which a heat carrier flows.

11. A device for absorbing radiant heat energy, comprising:
    a frame-like rack having a top;
    a heat radiation-permeable cover disposed on said top of said rack;
    a distributor tube for feeding a heat carrier into said rack, a plurality of collector tubes each communicating with said distributor tube, and a gathering tube communicating with each of said collector tubes, each of said tubes being disposed below said heat radiation-permeable cover;

a plurality of collector elements disposed on said collector tubes, each of said collector elements having an upper surface and a lower surface as seen in a direction of heat radiation entering said rack through said cover, a heat-absorbing coating disposed on said upper and said lower surfaces;

reflector means disposed below said collector elements as seen in the direction of the heat radiation entering said rack for reflecting heat radiation which has not been absorbed by said upper surface onto said lower surface;

said collector tubes being rotatably mounted in said rack in a mutually spaced-apart relationship for allowing said collector elements to be pivoted such that said upper surface faces towards the heat radiation entering said rack, wherein said rack has lateral edges, and the device further includes channel means disposed on said lateral edges for receiving an electrical heating line.

* * * * *